US011470971B2

(12) United States Patent
Saad et al.

(10) Patent No.: US 11,470,971 B2
(45) Date of Patent: Oct. 18, 2022

(54) RECONFIGURABLE DOLLY

(71) Applicant: That Cat Camera Support, LLC, Stratford, CT (US)

(72) Inventors: Philip Saad, Stratford, CT (US); Millo Bertini, Trumbull, CT (US); Douglas Armstrong, New York, NY (US)

(73) Assignee: THAT CAT CAMERA SUPPORT, LLC, Stratford, CT (US)

( * ) Notice: Subject to any disclaimer, the term of this patent is extended or adjusted under 35 U.S.C. 154(b) by 307 days.

(21) Appl. No.: 16/888,674

(22) Filed: May 30, 2020

(65) Prior Publication Data

US 2020/0383482 A1    Dec. 10, 2020

Related U.S. Application Data

(60) Provisional application No. 62/854,550, filed on May 30, 2019.

(51) Int. Cl.
*A47C 9/02* (2006.01)
*A47C 7/50* (2006.01)
(Continued)

(52) U.S. Cl.
CPC .............. *A47C 7/006* (2013.01); *A47C 3/34* (2013.01); *A47C 3/40* (2013.01); *A47C 7/50* (2013.01); *A47C 9/02* (2013.01); *B60B 33/0005* (2013.01); *B60B 33/0023* (2013.01); *B60B 33/0039* (2013.01); *B60B 33/0068* (2013.01); *A47C 3/18* (2013.01); *A47C 9/00* (2013.01)

(58) Field of Classification Search
CPC .. A47C 7/006; A47C 3/18; A47C 3/34; A47C 3/40; A47C 7/50; A47C 9/00; A47C 9/02; B60B 33/0005; B60B 33/0023; B60B 33/0039; B60B 33/0068
USPC .......... 297/423.1, 423.25, 423.4, 461, 463.2; 248/188.7, 188.8
See application file for complete search history.

(56) References Cited

U.S. PATENT DOCUMENTS

| 464,618 | A | * | 12/1891 | Wheeler et al. | ....... | A47C 7/004 |
| | | | | | | 248/188.7 |
| 1,590,240 | A | * | 6/1926 | Gorton | ................ | A47C 1/0246 |
| | | | | | | 297/344.22 |

(Continued)

OTHER PUBLICATIONS

PCT International Search Report and Written Opinion dated Sep. 3, 2020 in corresponding Application No. PCT/US2020/035453, 11 pages.

*Primary Examiner* — Rodney B White
(74) *Attorney, Agent, or Firm* — Ware, Fressola, Maguire & Barber LLP

(57) ABSTRACT

Exemplary aspects of the present invention are directed to a reconfigurable dolly that may include a base, one or more base plates, that may be removable from the base and nest within the base, and one or more caster wheels connected to the base to allow for movement of the reconfigurable dolly relative to the surface on which the reconfigurable dolly may be positioned. The base of the reconfigurable dolly may be configured to be coupled to a base receiving tube. The base receiving tube may be configured for telescoping receipt of a seat receiving tube. The seat receiving tube may be telescopically positionable within the base receiving tube. The seat receiving tube may be configured for receipt and retention of an adjustable seat.

19 Claims, 17 Drawing Sheets

(51) Int. Cl.
*A47C 7/00* (2006.01)
*A47C 3/34* (2006.01)
*A47C 3/40* (2006.01)
*B60B 33/00* (2006.01)
*A47C 9/00* (2006.01)
*A47C 3/18* (2006.01)

(56) References Cited

U.S. PATENT DOCUMENTS

| | | | | |
|---|---|---|---|---|
| 2,780,277 | A * | 2/1957 | Ries | A47C 1/08 |
| | | | | 248/408 |
| 3,199,564 | A | 8/1965 | Waeltz | |
| 3,415,475 | A * | 12/1968 | Goodman | F16M 11/22 |
| | | | | 248/910 |
| 3,820,844 | A * | 6/1974 | Fortnam | A61G 15/14 |
| | | | | 297/423.37 |
| 3,917,203 | A * | 11/1975 | Heubeck | B60B 33/0089 |
| | | | | 280/43.24 |
| 3,994,466 | A * | 11/1976 | Troup | A47C 7/004 |
| | | | | 248/188.7 |
| 4,102,544 | A | 7/1978 | Goodlaxson | |
| 4,632,410 | A * | 12/1986 | Bainbridge | A47C 13/00 |
| | | | | 297/135 |
| D296,130 | S * | 6/1988 | Riske | D23/378 |
| 5,048,789 | A * | 9/1991 | Eason | F16M 11/10 |
| | | | | 248/188.7 |
| 5,242,211 | A * | 9/1993 | Grad | A47C 7/405 |
| | | | | 297/239 |
| D401,088 | S * | 11/1998 | Chen | D6/708.23 |
| 5,887,948 | A * | 3/1999 | Hannes | A47C 9/02 |
| | | | | 297/344.22 |
| 6,607,246 | B1 * | 8/2003 | Benden | A47C 7/52 |
| | | | | 297/423.4 |
| 7,219,956 | B2 * | 5/2007 | Zhang | A47C 7/004 |
| | | | | 297/195.11 |
| D552,898 | S * | 10/2007 | Wei | D6/375 |
| 7,452,034 | B2 * | 11/2008 | Jung | A47C 7/506 |
| | | | | 248/188.7 |
| 7,597,392 | B1 | 10/2009 | Gilmore | |
| 7,854,512 | B2 | 12/2010 | Tegland | |
| 7,922,134 | B2 * | 4/2011 | Gasser | A47C 7/004 |
| | | | | 280/47.38 |
| 8,066,624 | B1 * | 11/2011 | Stroup | A47C 9/002 |
| | | | | 482/121 |
| 8,079,644 | B1 * | 12/2011 | Pangilinan | A47C 16/02 |
| | | | | 108/93 |
| 8,517,472 | B1 * | 8/2013 | Proctor | A47C 7/50 |
| | | | | 297/423.38 |
| 8,544,943 | B2 * | 10/2013 | Fields | A47C 1/11 |
| | | | | 297/195.11 |
| 8,596,651 | B2 | 12/2013 | Canova | |
| 8,864,230 | B2 * | 10/2014 | Augustat | A47C 3/20 |
| | | | | 297/383 |
| 8,973,926 | B1 * | 3/2015 | Lensing | A47C 9/027 |
| | | | | 280/47.34 |
| 8,998,319 | B2 * | 4/2015 | Bahneman | A47C 9/00 |
| | | | | 297/214 |
| 9,144,315 | B1 * | 9/2015 | Cheng | A47C 7/506 |
| 9,254,041 | B2 * | 2/2016 | Kessler | A47C 7/5066 |
| 9,498,066 | B2 * | 11/2016 | Christianson | A47C 7/445 |
| 9,511,786 | B1 * | 12/2016 | Hickcox | B62B 3/008 |
| 9,578,969 | B1 * | 2/2017 | Su | A47C 7/52 |
| 9,706,849 | B2 * | 7/2017 | Su | A47C 7/506 |
| 10,143,308 | B2 * | 12/2018 | Walker | A47C 1/032 |
| 10,362,874 | B2 * | 7/2019 | Walker | A47C 9/025 |
| 11,045,002 | B1 * | 6/2021 | Saperton | A47C 7/004 |
| 2005/0088029 | A1 * | 4/2005 | Stokes | A47C 9/025 |
| | | | | 297/461 |
| 2007/0193133 | A1 | 8/2007 | Krupnick | |
| 2013/0334846 | A1 | 12/2013 | Bahneman et al. | |
| 2017/0007026 | A1 * | 1/2017 | Avery | A47C 7/006 |
| 2017/0066121 | A1 * | 3/2017 | Huang | A47C 7/62 |
| 2017/0112287 | A1 * | 4/2017 | Schmitz | A47C 9/02 |
| 2019/0254433 | A1 * | 8/2019 | Smit | A47C 4/028 |

* cited by examiner

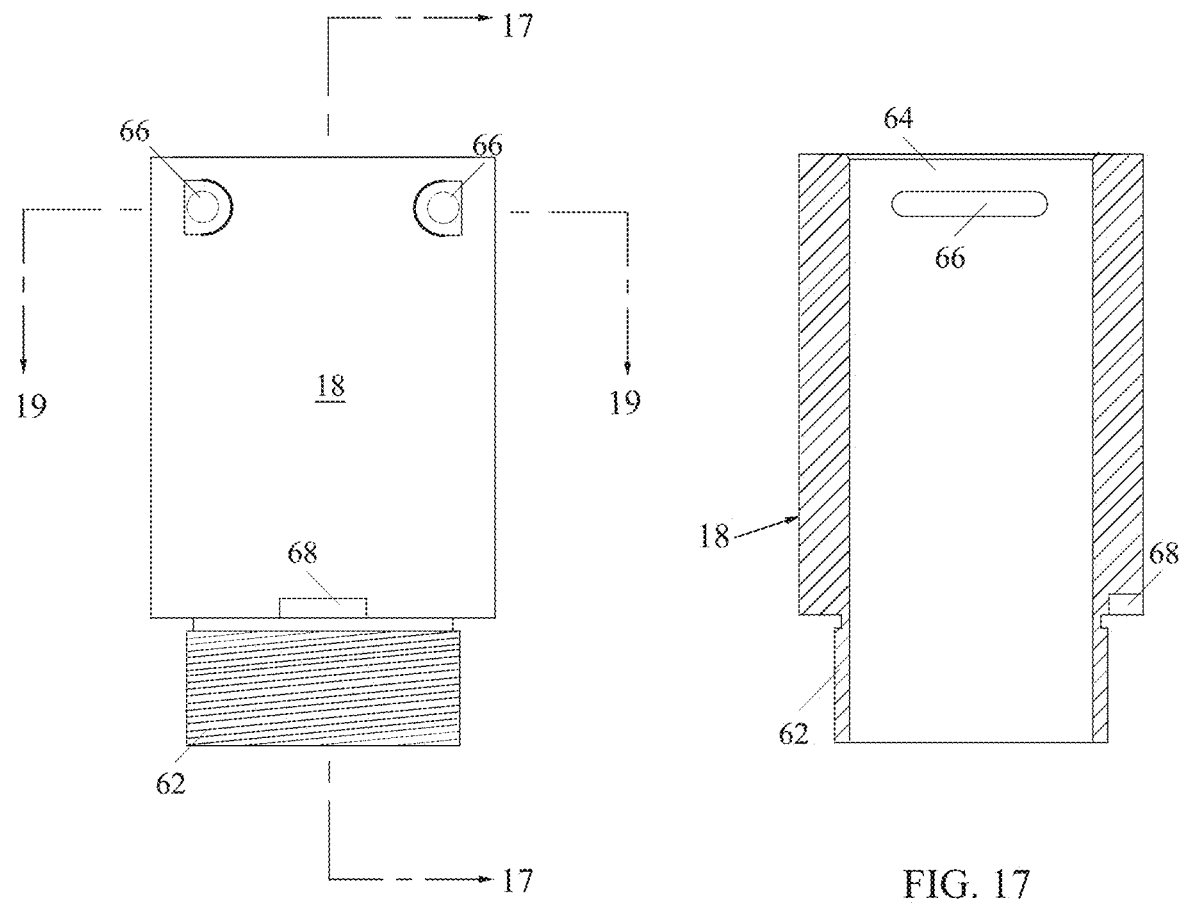
FIG. 16
FIG. 17
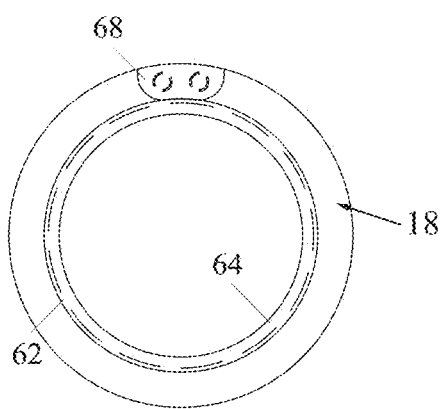
FIG. 18
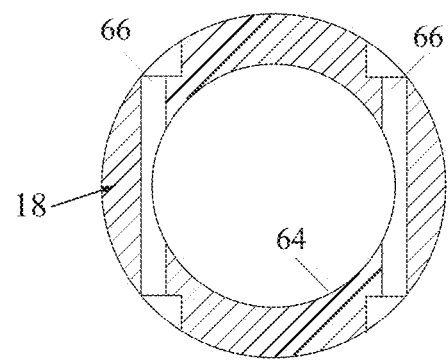
FIG. 19

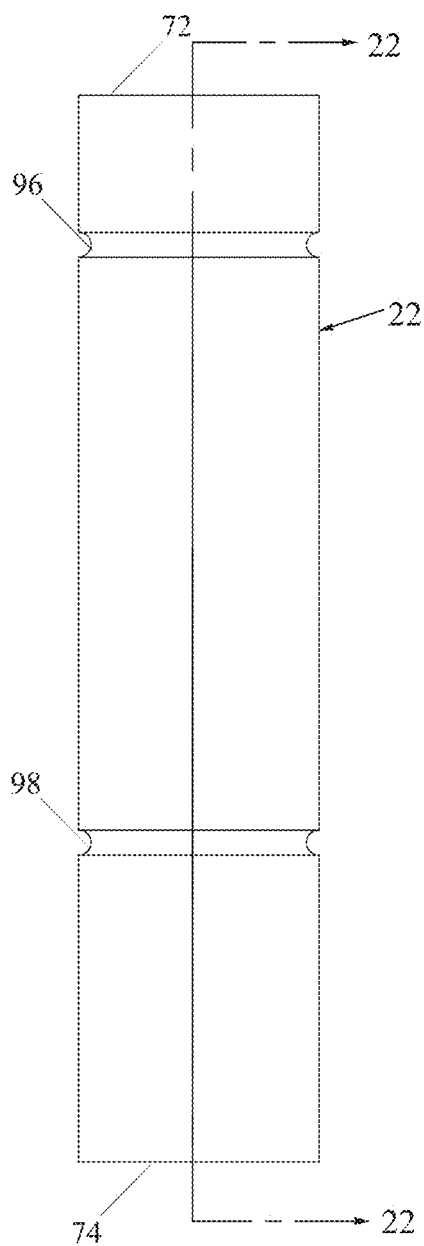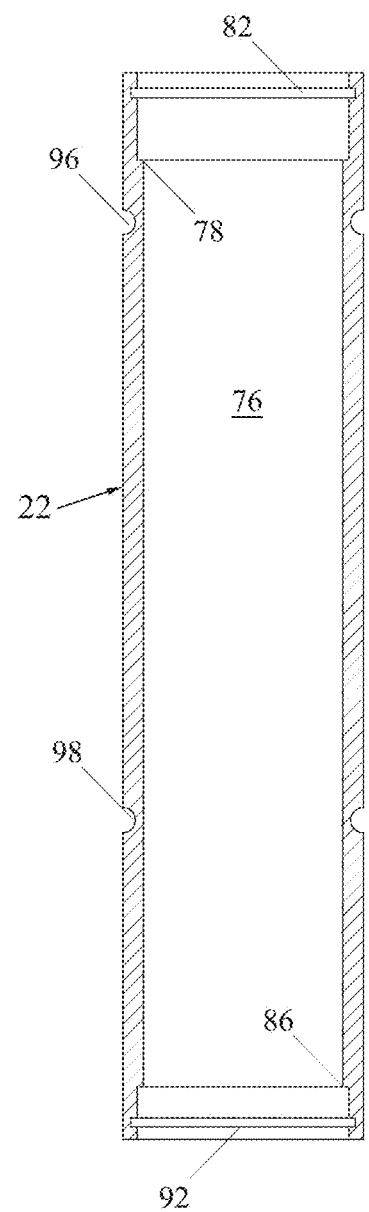
FIG. 21
FIG. 22

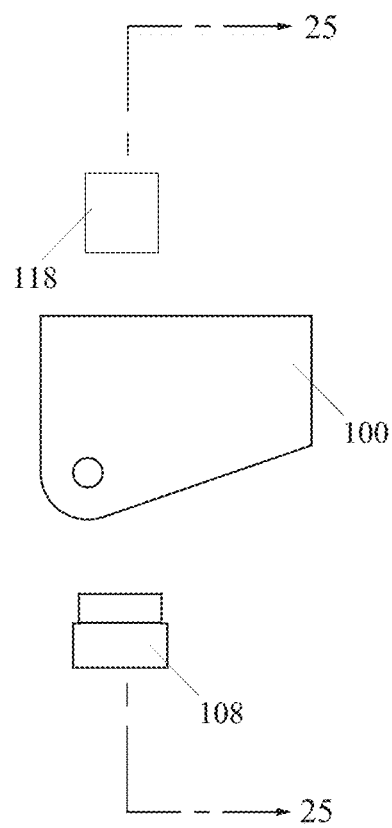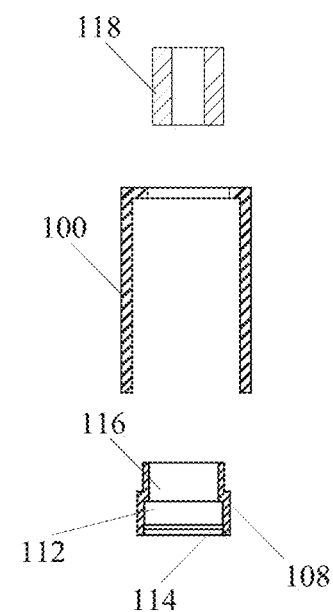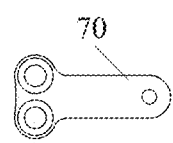
FIG. 24
FIG. 25
FIG. 26

RECONFIGURABLE DOLLY

CROSS-REFERENCE TO RELATED APPLICATIONS

This application claims priority to U.S. Provisional Appl. No. 62/854,550 filed May 30, 2019, which is hereby incorporated by reference in its entirety.

BACKGROUND OF THE INVENTION

Field of the Invention

The present invention generally relates to dollies, and more particularly to reconfigurable dolly configured to support and/or mobilize an individual, such as a camera operator, camera support equipment, motion camera, video camera, digital camera and/or any other piece of equipment that can be affixed to a motion picture industry mount.

SUMMARY OF THE INVENTION

Exemplary aspects of the present invention are directed to a new revolutionary reconfigurable dolly that is configured to mobilize a camera operator or any person, any camera support equipment, any motion camera, video camera, digital camera and any piece of equipment that can be mounted to a motion picture industry mount, for example a Mitchell mount.

The reconfigurable dolly may include a substantially circular base that may be equipped with eight 360° swivel wheels that may be placed at 45 degrees apart from each other at points around the circumference of the base. It is understood that additional or less swivel wheels may be used with the present invention, and that any spacing around the periphery and/or interior region of the base.

Alternatively, the base may have a fixed wheel system to provide a fixed direction of travel for the reconfigurable dolly when desired, or it may include both fixed wheels and swivel wheels.

Alternatively, the base may have a fixed wheel tracking wheel system to provide a fixed direction of travel on straight or curved track for the reconfigurable dolly when desired.

The base may be equipped with a standard motion picture industry Mitchell mount that may have two keyway sizes to accommodate all the keys that are installed on the equipment that can be mounted to the base.

The base may have a series of preferably 0.378" holes at several radius distances from the center, and the holes may be spaced at 22.5° intervals around the periphery of the base for rigging purposes. These rigging holes provide unlimited opportunities to mount any apparatus to the reconfigurable dolly base. The one or more of the rigging holes may be configured in a particular orientation to allow for mounting of a particular piece of equipment, for example a Cobra dolly column available from Chapman/Leonard Studio Equipment Inc.

The base of the reconfigurable dolly may have one or more removable base plates, and may have preferably four removable base plates at 90° intervals around the base. The removable base plates provide a viewing window through the base when removed for the operator pushing the base to see marks that may have been placed under the base. The removable base plates may have a tongue and preferably a two lever locking system so each removable base plate can be securely locked to the base. The removable base plates may preferably maintain the same pattern of 0.378" holes at several radius distances from the center at 22.5° intervals around interior of the base for rigging purposes.

The reconfigurable dolly may also include a base receiving tube configured for installation and/or removal on the base through the use of a standard motion picture industry castle nut. The base receiving tube may be configured to accept a seat receiving tube.

The reconfigurable dolly may also include a tapered roller bearing installed in the base of an adjustable seat receiving tube to make rotation corrections when the base changes directions.

The reconfigurable dolly may also include a Teflon bushing installed in the top of an adjustable seat receiving tube to assist in making rotation corrections when the base changes directions.

The reconfigurable dolly may also include an adjustable seat receiving tube configured to accept a seat piston, and configured for height adjustable installation into the base receiving tube. For example, the adjustable seat receiving tube may preferably have an adjustment range of 6" and its height position relative to the base receiving tube may be secured by a quick release pin, but it is understood that the present invention is not limited to any particular adjustment range, and larger and smaller adjustment ranges than the preferred adjustment range are contemplated by the present invention.

The reconfigurable dolly may include a 360° rotating seat with a piston release lever that preferably can be engaged at any location about the circumference of the piston release level. The seat piston may preferably have a 5.5" range, but it is understood that the present invention is not limited to any particular the range of adjustment of the seat piston, and larger and smaller ranges than the preferred adjustment range are contemplated by the invention.

The reconfigurable dolly may preferably have a total adjustment range of 11.5" with the uppermost position of the seat to be about 27.25" and the lowermost position of the seat to be about 16" relative to the surface on which the reconfigurable dolly may be positioned. This provides the greatest range and the lowest starting height of all of the previous art of this type of equipment. However, it is understood that the present invention is not limited to any particular total adjustment range, and larger and smaller total adjustment ranges than the preferred adjustment range are contemplated by the present invention.

The reconfigurable dolly may have a system of accessories to allow the base to be used for many motion picture applications. These accessories include various hardware to accept push bars, handles and any apparatus to control the reconfigurable dolly.

The reconfigurable dolly may have alternate means of travel such as blades to be used on ice, and such blades may be fixed or configured to swivel relative to the base depending upon the desired application of the reconfigurable dolly.

The reconfigurable dolly may also include a 0.375 bumper, preferably made from a non-marring rubber or other impact absorbing material, installed into a groove on the circumference of the base to prevent the clanging of metal to avoid ruining a sound take.

According to an exemplary aspect of the present invention, a reconfigurable dolly is provided that may include a base that may have an outer ring and an inner ring, at least one removable base plate positioned between the outer ring and the inner ring of the base, and at least one caster wheel operatively coupled to the base.

In accordance with this or other exemplary aspects of the present invention, the outer ring and the inner ring may connected by at least one connecting member, and the outer ring, the inner ring and the at least one connecting member may define at least one removable base plate aperture in the base.

In accordance with this or other exemplary aspects of the present invention, each of the at least one removable base plate apertures may include a ledge extending at least partially around the perimeter of each of the removable base plate apertures.

In accordance with this or other exemplary aspects of the present invention, the outer ring may include at least one caster wheel connecting hole configured to operatively couple the at least one caster wheel to the base by a fastener.

In accordance with this or other exemplary aspects of the present invention, the connecting member may include at least one inner rigging hole, and the outer ring may include at least one outer rigging hole.

In accordance with this or other exemplary aspects of the present invention, the inner ring may include a central opening formed therein and at least one keyway extending radially from the central opening.

In accordance with this or other exemplary aspects of the present invention, the base may include a circumferential groove formed at least partially around the perimeter of the base, and a bumper disposed at least partially within the circumferential groove and extending at least partially around the perimeter of the base.

In accordance with this or other exemplary aspects of the present invention, the base plate may include a peripheral wing extending at least partially around the perimeter of the base plate, and the peripheral wing may be configured for engagement with the ledge of the base.

In accordance with this or other exemplary aspects of the present invention, the base plate may include at least one plate rigging hole.

In accordance with this or other exemplary aspects of the present invention, the base plate may include at least one pivotable cam lock, and the pivotable cam lock may be positionable between an open position in which substantially the entirety of the pivotable cam lock is encompassed within the base plate, and a locked position in which at least a portion of the pivotable cam lock extends past the base plate, and the pivotable cam lock may be configured for locking engagement with the outer ring of the base when the pivotable cam lock is in the locked position.

In accordance with this or other exemplary aspects of the present invention, the caster wheel may include a fork configured to receive a wheel to allow the wheel to rotate about the axis of rotation of the wheel, and a bearing housing configured for receipt of a bearing to allow for pivotable coupling to the base.

In accordance with this or other exemplary aspects of the present invention, the reconfigurable dolly may also include a base receiving tube having a threaded portion that is dimensioned to pass through the central opening of the inner ring, and may be configured for threaded engagement with a castle nut to affix the base receiving tube to the base.

In accordance with this or other exemplary aspects of the present invention, the reconfigurable dolly may also include a base receiving tube configured for removable attachment to the base.

In accordance with this or other exemplary aspects of the present invention, the base receiving tube may include a longitudinal central bore, and at least one pin receiving bore positioned substantially perpendicular to the longitudinal central bore.

In accordance with this or other exemplary aspects of the present invention, the reconfigurable dolly may also include a seat receiving tube configured for telescopic arrangement with the base receiving tube, and positionable at a first height relative to the base receiving tube and a second height relative to the base receiving tube.

In accordance with this or other exemplary aspects of the present invention, a length of the seat receiving tube and the base receiving tube at the first height may be greater than a length of the seat receiving tube and the base receiving tube at the second height.

In accordance with this or other exemplary aspects of the present invention, the seat receiving tube may include a first end, a second end and a longitudinal passage connecting the first end to the second end.

In accordance with this or other exemplary aspects of the present invention, the first end may include a shoulder positioned within the longitudinal passage and configured for receipt of a collar, the first end may include a notch formed within the longitudinal passage for retention of a retaining ring, the second end may include a shoulder positioned within the longitudinal passage and configured for receipt of a bearing, the seat receiving tube may include a seat base configured for positioning within the bearing, and the second end may include a notch formed within the longitudinal passage for retention of a retaining ring.

In accordance with this or other exemplary aspects of the present invention, the seat receiving tube may include a first circumferential groove formed in the exterior of the seat receiving tube and positioned towards the first end of the seat receiving tube, and the seat receiving tube may include a second circumferential groove formed in the exterior of the seat receiving tube and positioned towards the second end of the seat receiving tube.

In accordance with this or other exemplary aspects of the present invention, the central opening and at least one keyway may be configured in the form of a Mitchell mount.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

BRIEF DESCRIPTION OF THE SEVERAL
VIEWS OF THE DRAWINGS

For a fuller understanding of the nature and object of the present invention, reference should be had to the following detailed description taken in connection with the accompanying drawings, in which:

FIG. 16 is a side view of the exemplary base receiving tube;

FIG. 17 is a cross-sectional view taken along line 17-17 from FIG. 16;

FIG. 18 is a bottom plan view of the exemplary base receiving tube;

FIG. 19 is a cross-sectional view taken along line 19-19 from FIG. 16;

FIG. 21 is a side view of the exemplary seat receiving tube;

FIG. 22 is a cross-sectional view taken along line 22-22 from FIG. 21;

FIG. 24 is an exploded view of selected components of the exemplary caster wheel;

FIG. 25 is a cross-sectional view taken along line 25-25 from FIG. 24; and

FIG. 26 is a top plan view of an exemplary key for use with the exemplary reconfigurable dolly.

DETAILED DESCRIPTION

Figure 1:
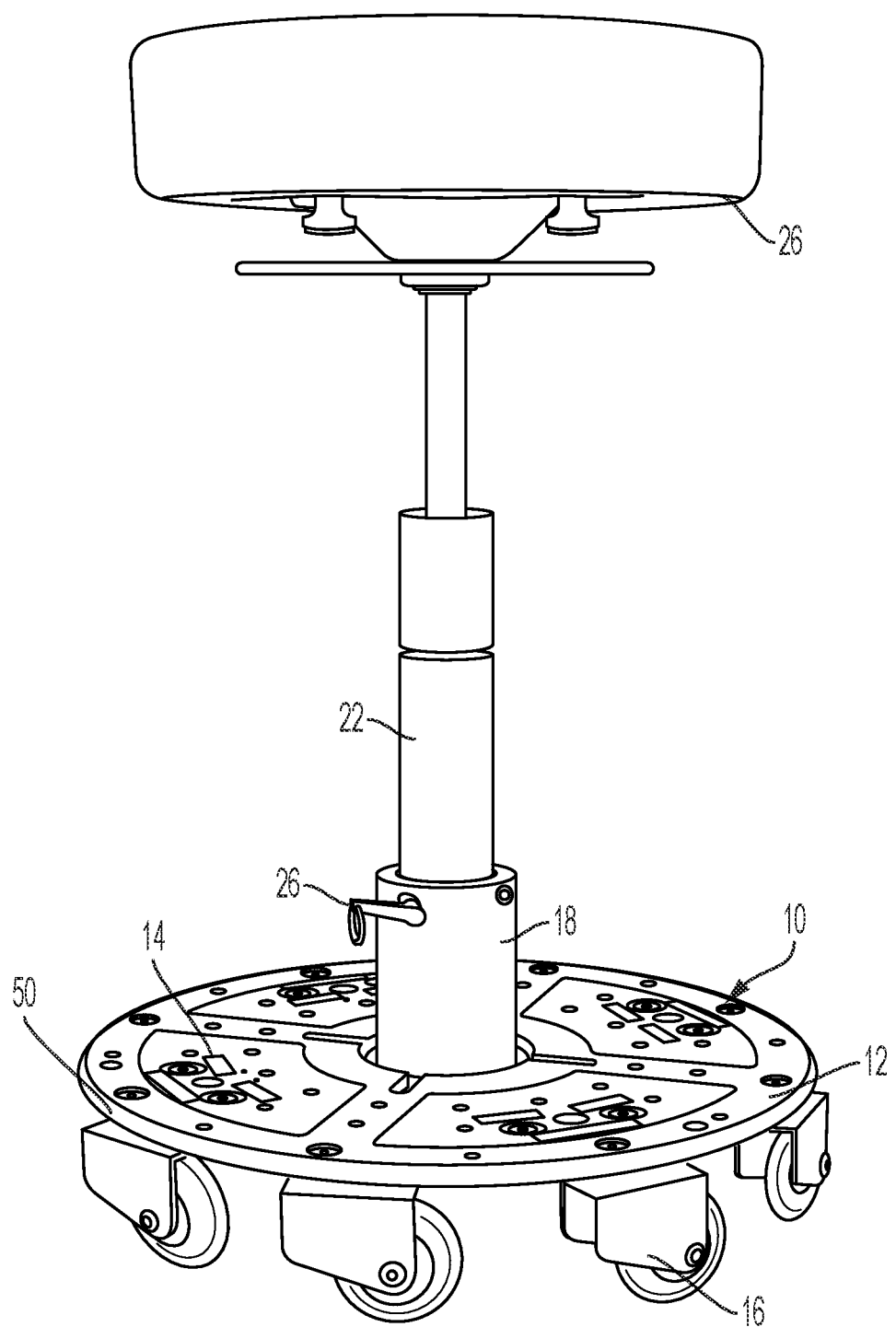
FIG. 1 is a perspective view of an exemplary base of an exemplary reconfigurable dolly with an exemplary seat receiving tube positioned at a first height relative to the exemplary base and an exemplary seat positioned at a first height relative to the seat receiving tube of the reconfigurable dolly.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Figure 2:
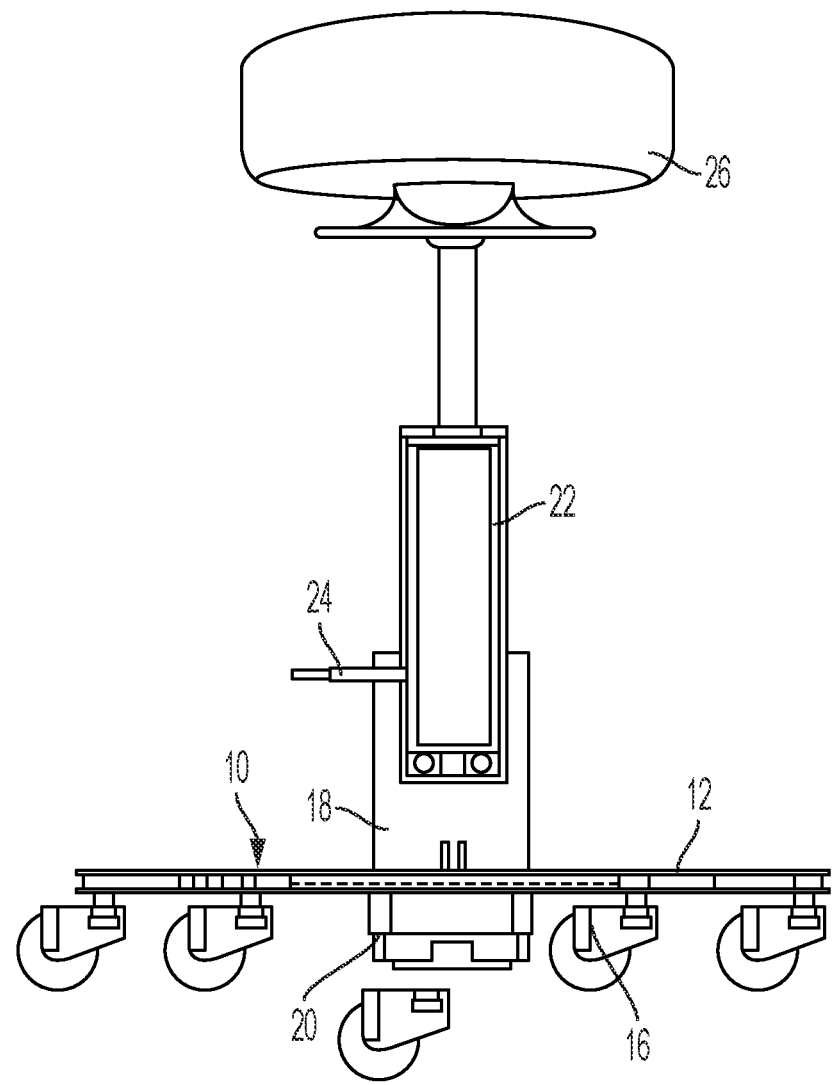
FIG. 2 is a partial cross-sectional and partial exploded view of the view of FIG. 1.
Figure 3:
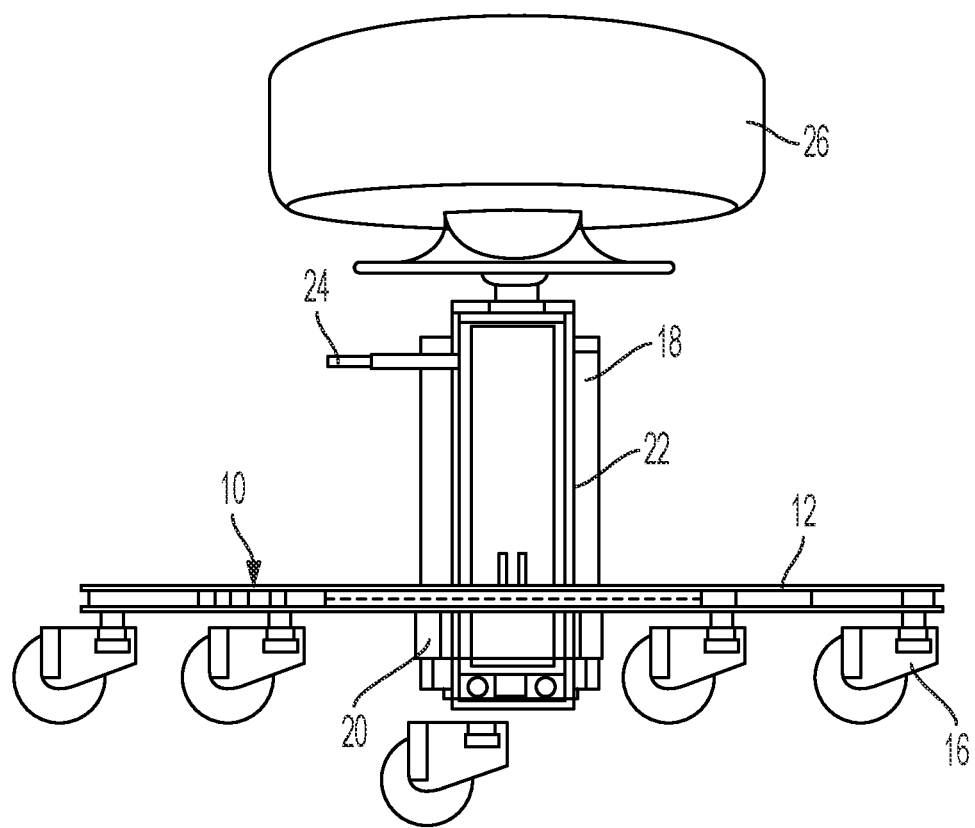
FIG. 3 is a partial cross-sectional and partial exploded view of the exemplary base of the exemplary reconfigurable dolly with the exemplary seat receiving tube positioned at a second height relative to the exemplary base and the exemplary seat positioned at a second height relative to the seat receiving tube of the reconfigurable dolly.
Figure 4:
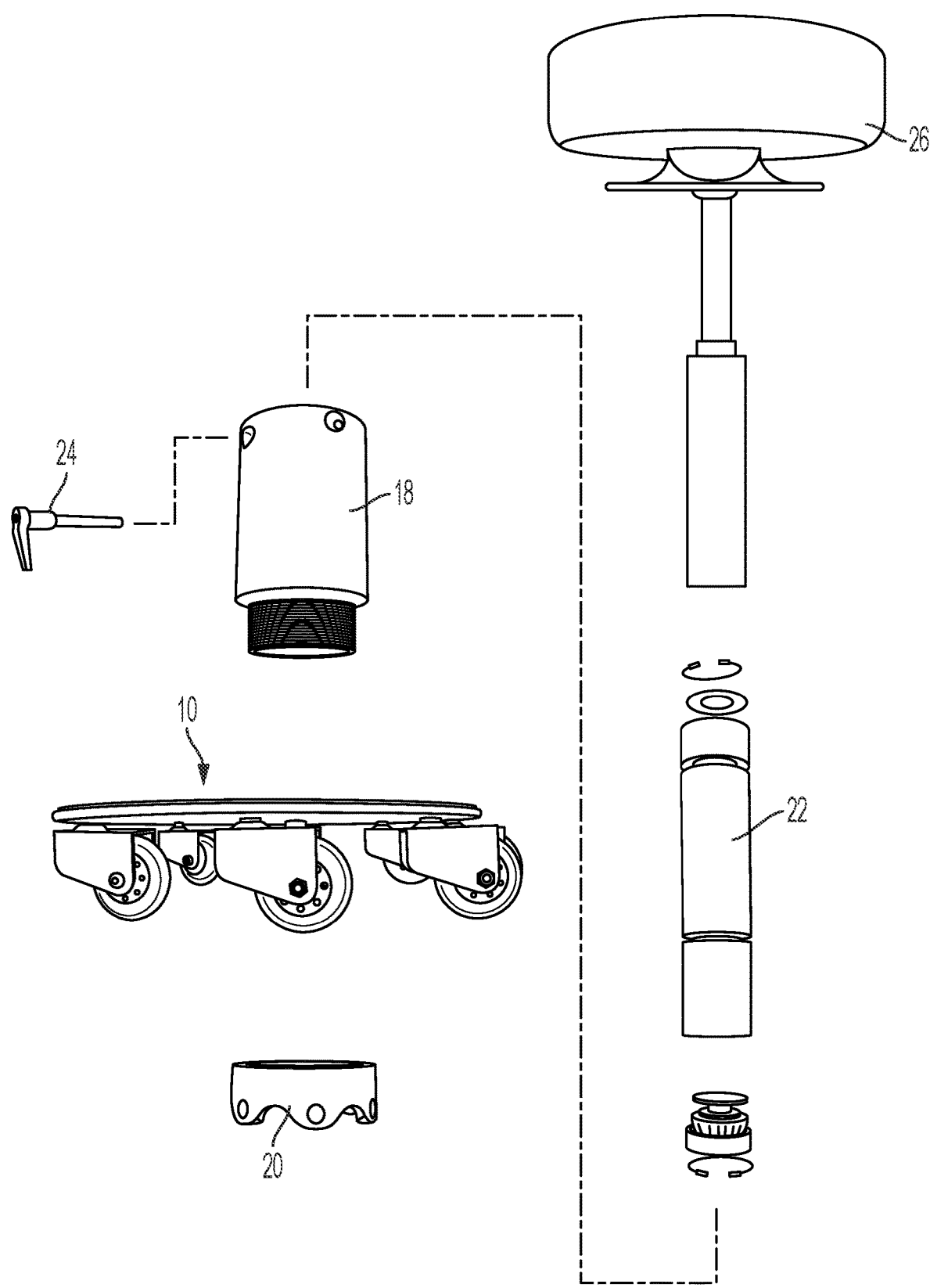
FIG. 4 is a partial exploded view of the exemplary reconfigurable dolly with various exemplary components.
Figure 5:
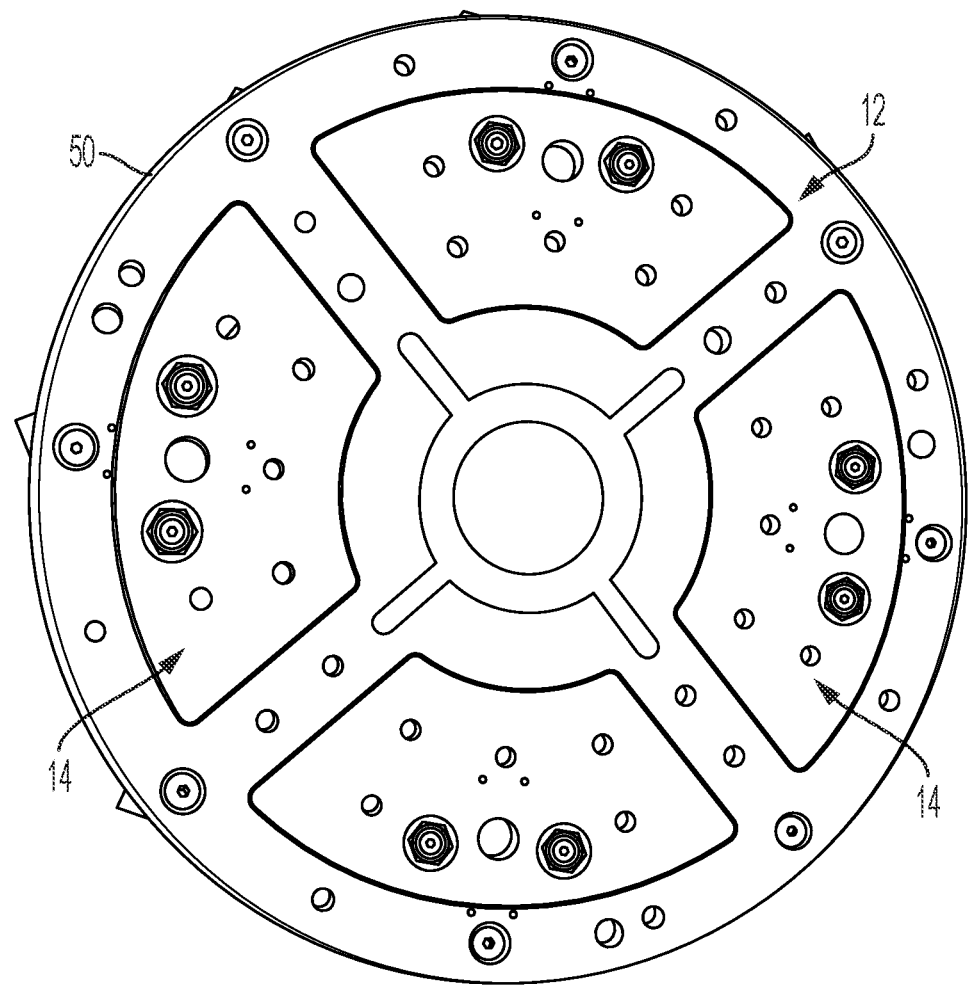
FIG. 5 is a top plan view of the exemplary base of the exemplary reconfigurable dolly with exemplary base plates installed therein.
Figure 6:
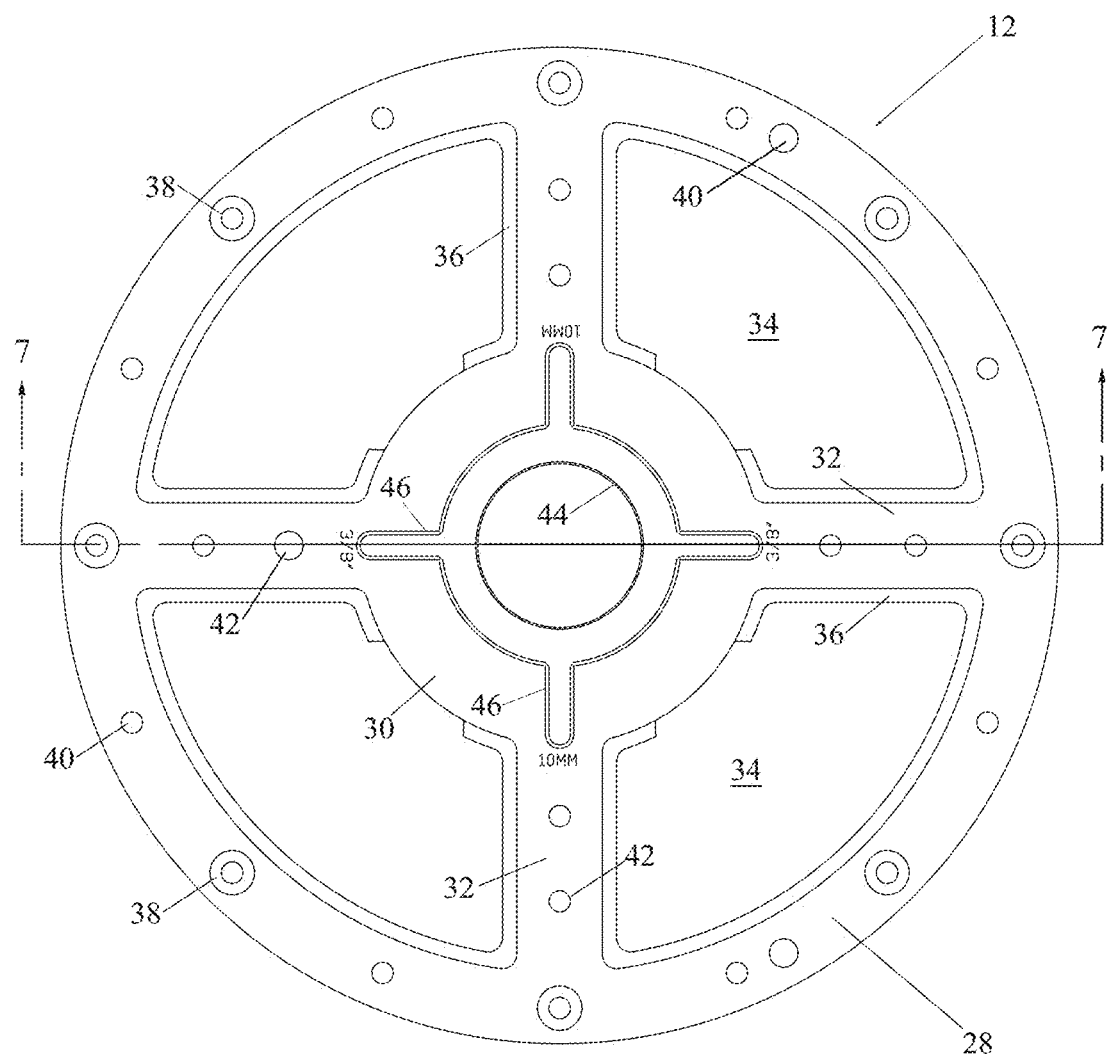
FIG. 6 is a top plan view of the exemplary base of the exemplary reconfigurable dolly.
Figure 7:
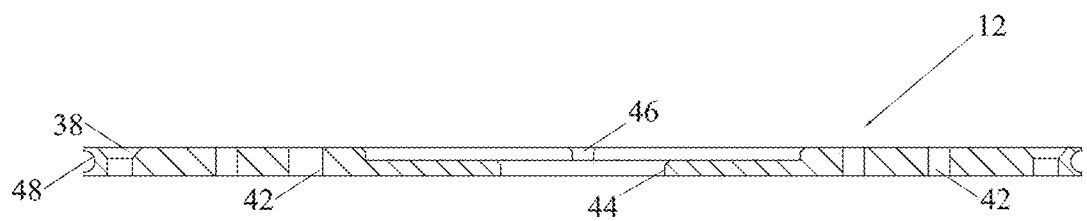
FIG. 7 is a cross-sectional view taken along line 7-7 from FIG. 6.
Figure 8:
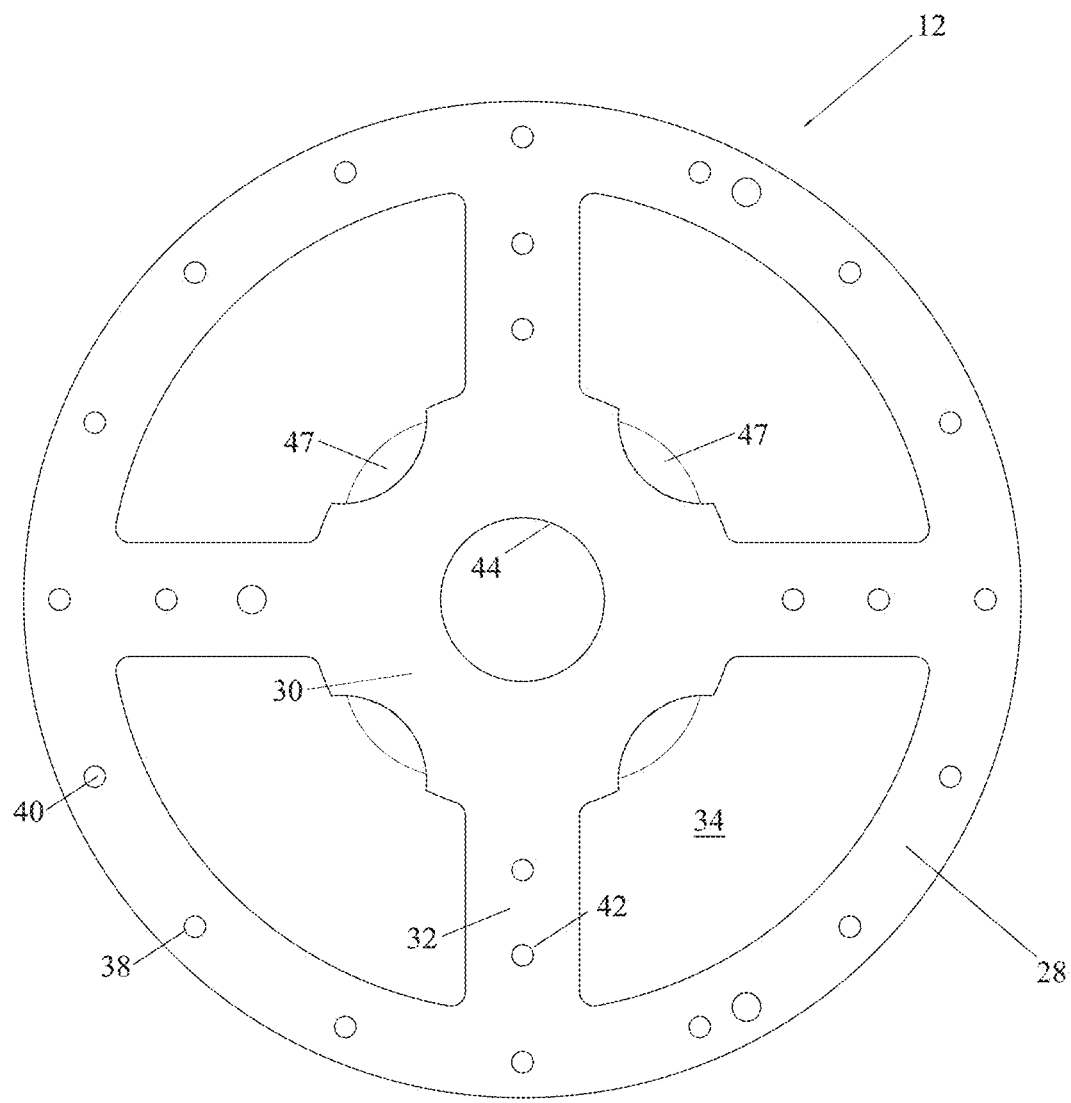
FIG. 8 is a bottom plan view of the exemplary base of the exemplary reconfigurable dolly.
Figure 9:
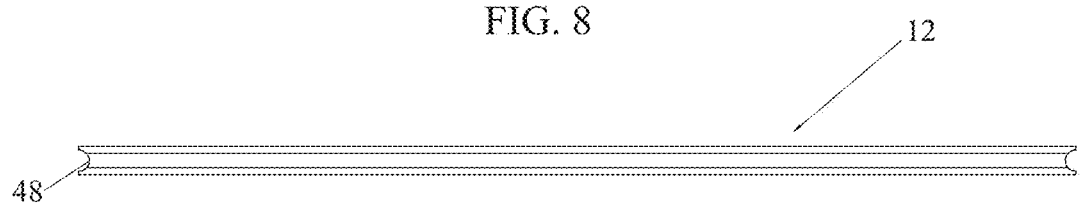
FIG. 9 is a side view of the exemplary base of the exemplary reconfigurable dolly.
Figure 8A:
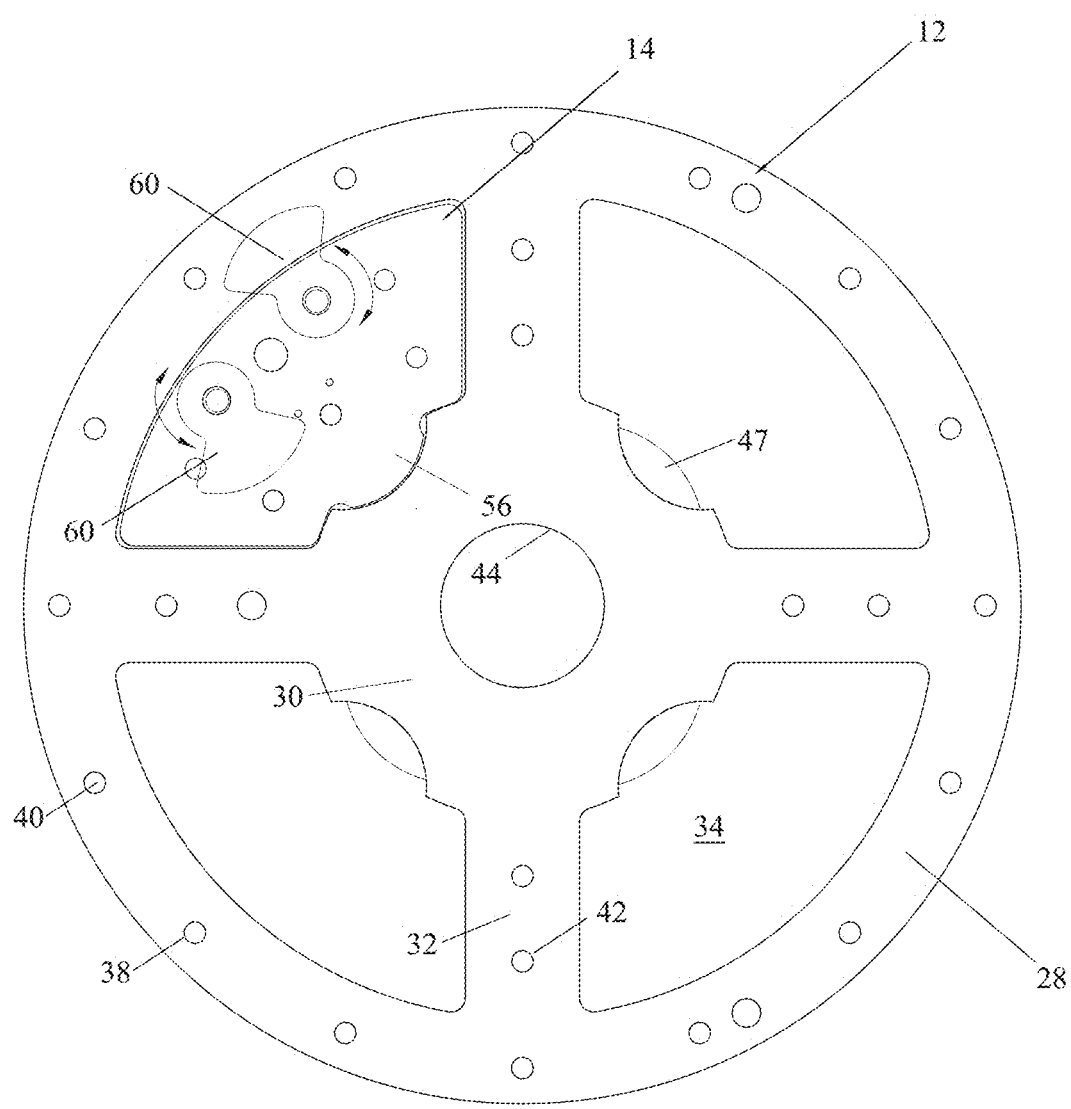
FIG. 8A is a bottom plan view of the exemplary base of the exemplary reconfigurable dolly with an exemplary base plate installed therein.
Figure 10:
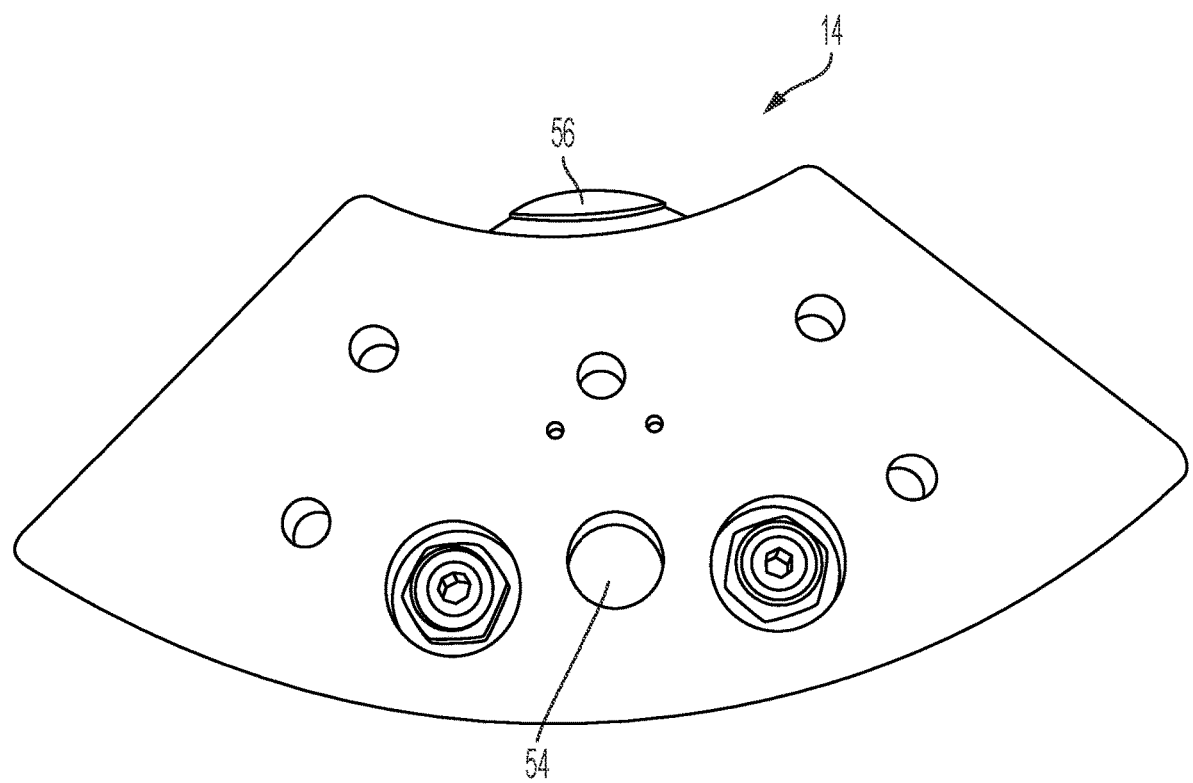
FIG. 10 is a top plan view of the exemplary base plate of the exemplary reconfigurable dolly.
Figure 11:
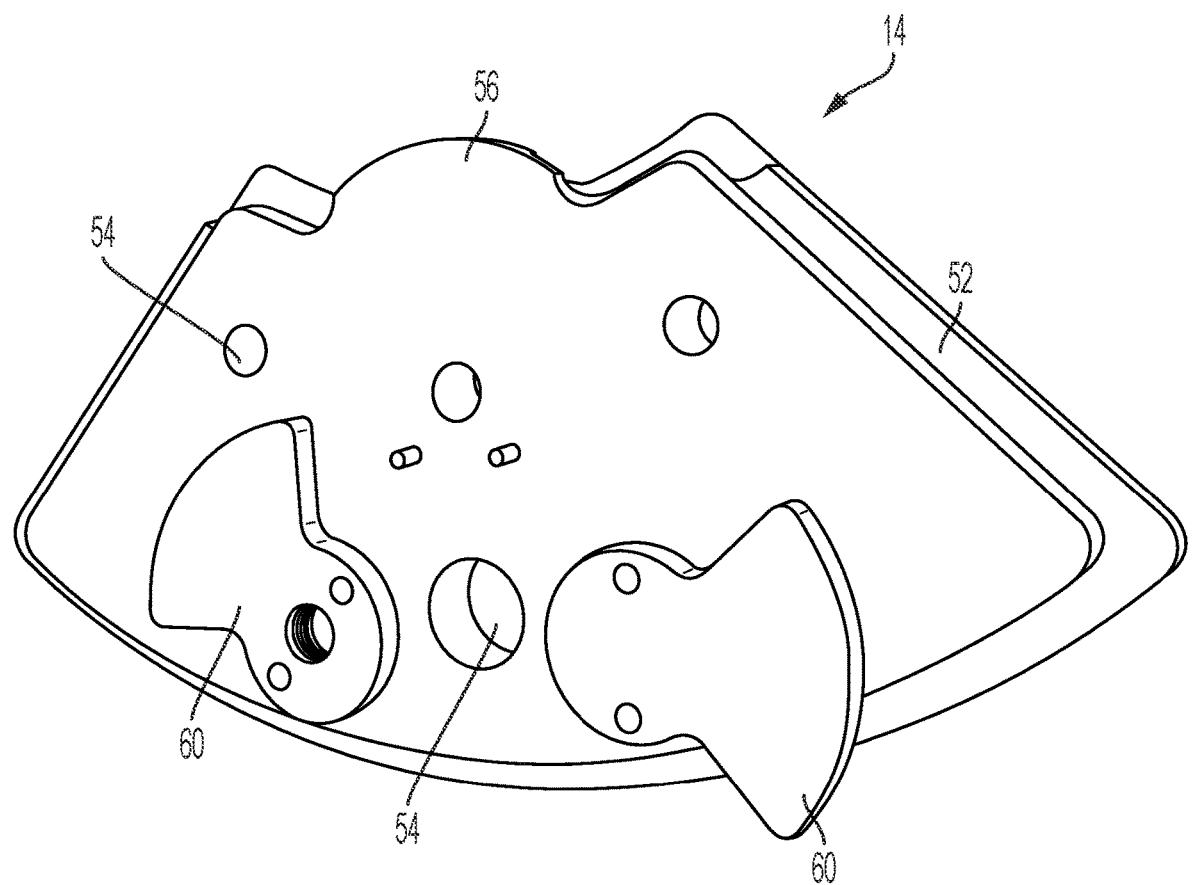
FIG. 11 is a bottom perspective view of the exemplary base plate of the exemplary reconfigurable dolly.
Figure 12:
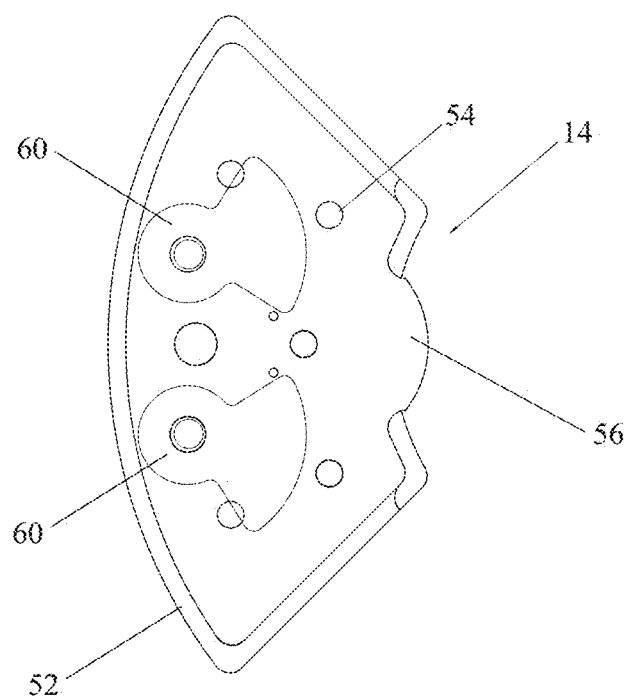
FIG. 12 is a bottom plan view of the exemplary base plate of the exemplary reconfigurable dolly.
Figure 14:
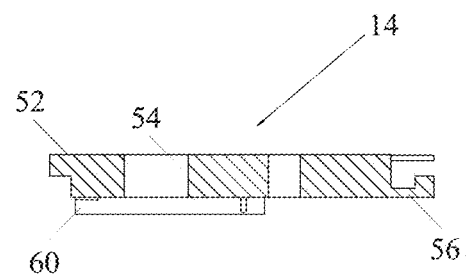
FIG. 14 is a cross-sectional view taken along line 14-14 from FIG. 13.
Figure 13:
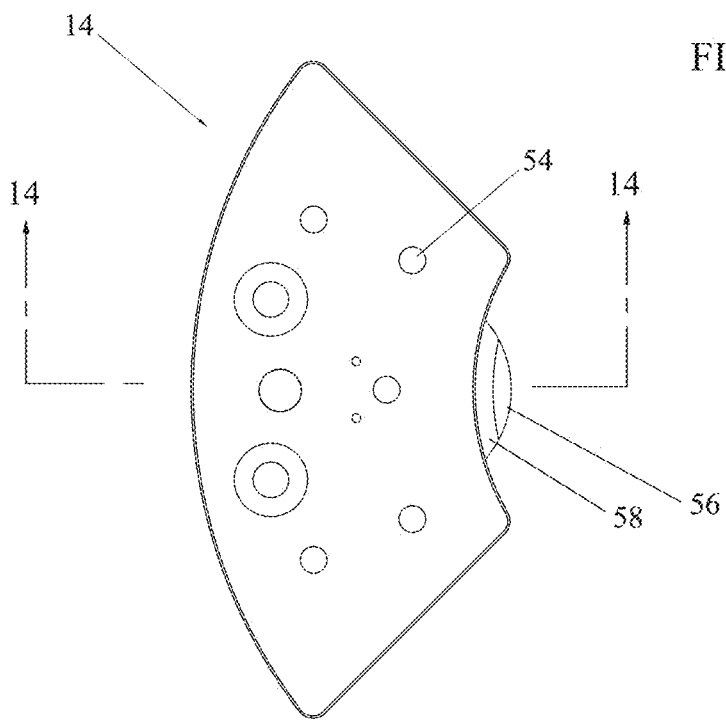
FIG. 13 is a top plan view of the exemplary base plate of the exemplary reconfigurable dolly.
Figure 15:
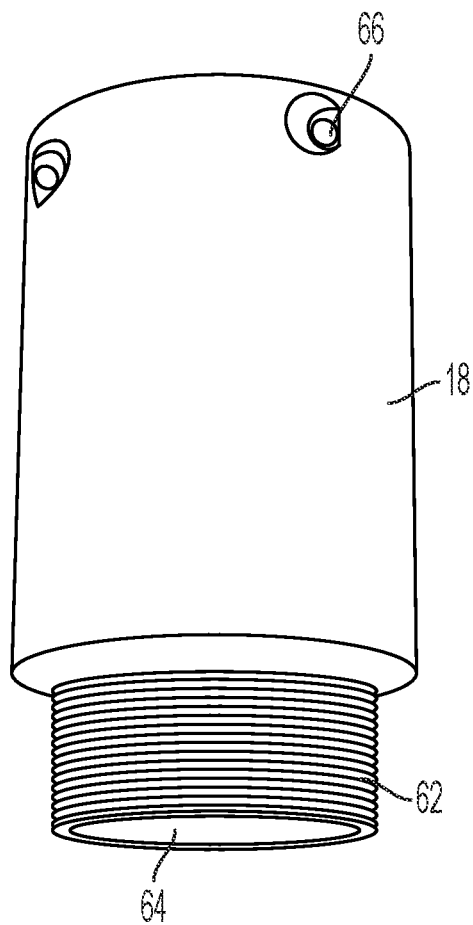
FIG. 15 is a side view of an exemplary base receiving tube and castle nut that may be coupled to the exemplary reconfigurable dolly.
Figure 15:
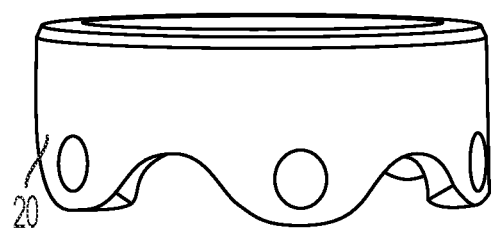

Referring to FIGS. 1-4 therein illustrated is an exemplary reconfigurable dolly, generally indicated by reference numeral 10, according to an aspect of the present invention. The reconfigurable dolly 10 may include a base 12, one or more base plates 14, that may be removable from the base 12 and nest within the base 14, and one or more caster wheels 16 connected to the base 12 to allow for movement of the reconfigurable dolly 10 relative to the surface on which the reconfigurable dolly 10 may be positioned. The reconfigurable dolly 10 may preferably be equipped with eight 360° caster wheels 16 that may be placed at 45 degrees apart from each other at points around the circumference of the base 12. It is understood that additional or less caster wheels 16 may be used with the present invention, and having any spacing around the periphery and/or interior region of the base 12. Alternatively, the base 12 may have a fixed wheel system (not shown) to provide a fixed direction of travel for the reconfigurable dolly 10 when desired, or it may include both fixed wheels and caster wheels 16. The base 12 of the reconfigurable dolly 10 may be configured to be coupled to a base receiving tube 18, and the base receiving tube 18 may be secured to the base 12 by affixing a castle nut 20 to the base receiving tube 18. The base receiving tube 18 may be configured for telescoping receipt of a seat receiving tube 22, and the seat receiving tube 22 may be secured within the base receiving tube 18 by a handle pin 24, which may be for example as standard LA handle pin. The seat receiving tube 22 may be telescopically positionable within the base receiving tube 18 so that it can be positioned at at least two positions relative to the base 12 of the reconfigurable dolly 10. For example, the seat receiving tube 22 may be positioned at a first position, as shown in FIGS. 1 and 2, so that the seat receiving tube 22 is spaced away relative to the base 12, or the seat receiving tube 22 may be positioned at a second position, as shown in FIG. 3, so that the seat receiving tube 22 is closer to the base 12 than in the first position. It is understood that the seat receiving tube 22 may be positioned at any number of locations within the base receiving tube 18 relative to the base 12 of the reconfigurable dolly 10, and that the discussed first position and second position are merely exemplary and not limiting to the various aspects of the present invention. The seat receiving tube 22 may be configured for receipt and retention of an adjustable seat 26, for example a piston actuated adjustable seat such as a PERCH replacement seat top with control available from Perch Chair and Stools of Black Hawk, Colo.

Referring now to FIGS. 5-9, the exemplary base 12 of the reconfigurable dolly 10 may include an outer ring 28 and an inner 30 that may be connected to each other by at least one connecting member 32. The outer ring 28, the inner ring 30 and one or more of the connecting members 32 may define at least one removable base plate aperture 34 in the base 12. Each of the removable base plate apertures 34 may include a ledge 36 extending at least partially around the perimeter of the removable base plate apertures 34. The removable base plate apertures 34 are dimensioned so as to receive a base plate 14 nested therein, and the base plate 14 may rest on the ledge 36 of the removable base plate aperture 34 so that an upper surface of the base plate 14 is on substantially the same plane as upper surfaces of the outer ring 28, the inner ring 30 and the one or more connecting members 32.

The outer ring 28 may include one or more caster wheel connecting holes 38 that may be used to pivotably secure the one or more caster wheels 16 to the base. The outer ring 28 may also include one or more outer rigging holes 40 spaced apart around the outer ringer 28. The one or more outer rigging holes 40 may be used to secure various components or devices to the reconfigurable dolly 10. Preferably, the outer rigging holes 40 may be spaced at 22.5° intervals around the outer ring 28 of the base 10 for rigging purposes. The outer rigging holes 40 are configured to mount any apparatus to the reconfigurable dolly 10. Each of the one or more connecting members 32 may include one or more inner rigging holes 42 that may be used, in combination with the outer rigging holes 40 or alone, to secure various components or devices to the reconfigurable dolly 10. The inner ring 30 of the base 12 may include a central opening 44 formed therein, and may also include one or more keyways 46 extending from the central opening 44. The one or more keyways 46 may be integrated as part of a standard motion picture industry Mitchell mount that may have two keyway 46 sizes to accommodate all the keys that are installed on the equipment that can be mounted to the base 12. On a side of the base 12 opposite the one or more keyways 46, the base 12 may include one or more arcuate cutouts 47. The base 12 may also include a circumferential groove 48 formed at least partially around the perimeter face of the base 12. The circumferential groove 48 may be configured for retention of a bumper 50 extending at least partially around the perimeter face of the base.

Referring now to FIGS. 8A and 10-14, the base plate 14 may include a peripheral wing 52 extending at least partially around the perimeter of the base plate 14. The peripheral wing 52 may be configured for engagement with the ledge 36 of the base 12 that the base plate 14 may be supported within the removable base plate aperture 34 of the base 12. The base plate 14 may also include at least one plate rigging hole 54 that may be configured for attachment of various components and/or devices to the base plate 14. The plate rigging holes 54 may be used in conjunction with the outer rigging holes 40 and/or inner rigging holes 42 to allow for a variety of combination of mounting options. The base plate 14 may also include a tongue 56 extending from the base plate 14, preferably along a portion of the perimeter of the base plate 14 that does not include the peripheral wing 52 extending therefrom. The tongue 56 may include a groove 58 formed therein that facilitates engagement of the base plate 14 with the base 12. The tongue 56 may be dimensioned and positioned on the base plate 14 so as to allow for engagement with the arcuate cutout 47 in the inner ring 30 of the base 12. In this manner, the base plate 14 may be secured from upward separation away from the inner ring 30 of the base 12 by the tongue 56. To provide for security from upward separation from the outer ring 28 of the base 12, but still allow for removal of the base plate 14 from the base 12, the base plate 14 may include on or more pivotable cam locks 60. The pivotable cam lock 60 may be positionable between an open position in which all of or at least substantially the entirety of the pivotable cam lock 60 is encompassed within the base plate 14, as shown for example by the lower pivotable cam lock 60 in FIG. 8A, and a locked position in which at least a portion of the pivotable cam lock 60 extends past the base plate 14, as shown for example by the upper pivotable cam lock in FIG. 8A. The pivotable cam lock 60 may be configured for locking engagement with the outer ring 28 of the base 12 when the pivotable cam lock 60 is in the locked position.

Referring now to FIGS. 15-19, the base receiving tube 18 may include a threaded portion 62 that is dimensioned to pass through the central opening 44 of the inner ring 30 of the base 12. The castle nut 20 may then be threadenly engaged with the threaded portion 62 of the base receiving tube 18 in order to secure the base receiving tube 18 to the base 12 of the reconfigurable dolly 10. The base receiving tube 18 may also include a longitudinal central bore 64, and positioned at least substantially perpendicular to the longitudinal central bore 64 one or more pin receiving bores 66 that are dimensioned so as to receive the handle pin 24. The one or more pin receiving bores 66 intersect with the longitudinal central bore 64 to an extent such that at least a portion of the handle pin 24 inserted into the pin receiving bore 66 extends at least partially into the central bore 64. As discussed further below, this arrangement allows for adjustment and support of the seat receiving tube 22 relative to the base receiving tube 18. The base receiving tube 18 may also include a key receiving notch 68 that is configured to allow a key, for example the key 70 shown in FIG. 26, to be affixed to the base receiving tube 18 by one or more fasteners (not shown). With the key 70 affixed to the base receiving tube 18, the key 70 may be positioned in one of the keyways 46 of the base 12 so that the base receiving tube 18 is less likely to become loosened from the base 12 during usage of the reconfigurable dolly 10.

Figure 20:
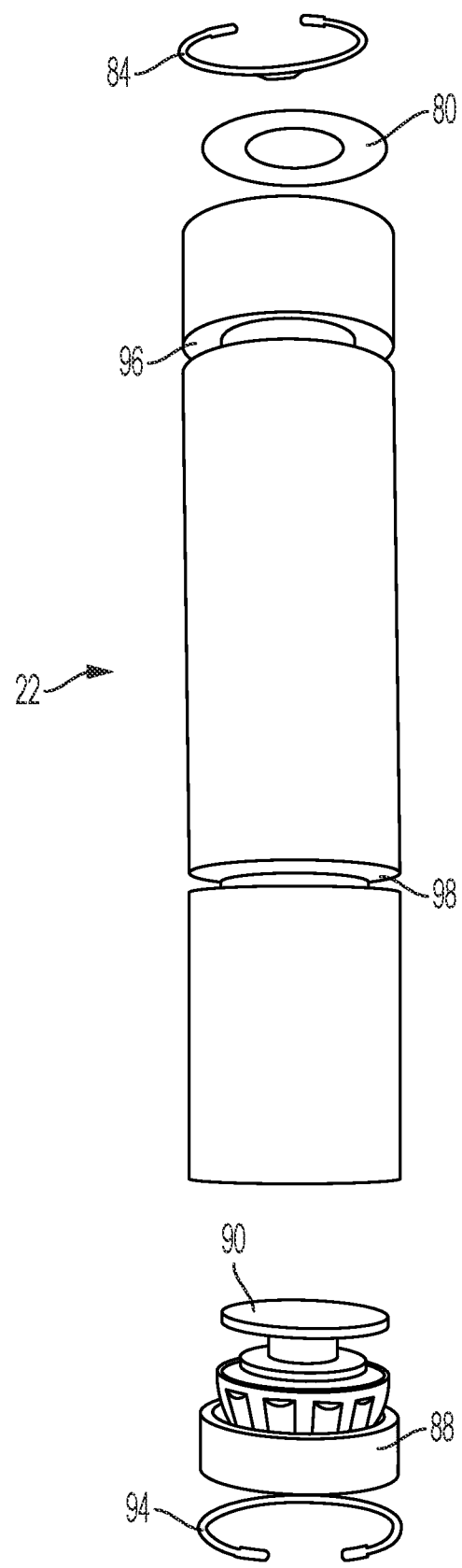
FIG. 20 is an exploded view of the exemplary seat receiving tube that may be coupled to the exemplary reconfigurable dolly.

Referring now to FIGS. 20-22, the seat receiving tube 22 may include a first end 72 and a second end 74 with a longitudinal passage 76 connecting the first end 72 to the second end 74. The first end 72 of the seat receiving tube 22 may include a shoulder 78 configured for receipt of a collar 80, and a notch 82 configured for receipt of a retaining ring 84. The retaining ring 84 is configured so as to be positioned within the notch 82 so that the collar 80 is retained within the longitudinal passage 76 of the seat receiving tube 22. The first end 72 of the seat receiving tube 22 may also be configured for receipt of a piston of the adjustable seat 26, and the collar 80 may be positioned around the piston so as to affix the adjustable seat 26 to the seat receiving tube 22. The second end 74 of the seat receiving tube 22 may include a shoulder 86 configured for receipt of a bearing 88, for example a tapered roller bearing such as a TIMKIN tapered roller bearing model no. 21075/21212. A seat base 90 may be positioned within the bearing 88 to act as a surface on which the piston of the adjustment seat 26 may be engaged with. The second end 74 of the seat receiving tube 22 may also include a notch 92 configured for receipt of a retaining ring 94. The retaining ring 94 is configured so as to be positioned within the notch 92 so that the bearing 88 is retained within the longitudinal passage 76 of the seat receiving tube 22. The seat receiving tube 22 may also include a first circumferential groove 96 formed in the exterior of the seat receiving tube 22 and positioned towards the first end 72 of the seat receiving tube 22. The seat receiving tube 22 may also include at least a second circumferential groove 98 formed in the exterior of the seat receiving tube 22 and positioned towards the second end 74 of the seat receiving tube 22. These circumferential grooves 96, 98 provide a recessed area in which the portion of the handle pin 24 extending into the longitudinal central bore 64 of the base receiving tube 18 can engage with the seat receiving tube 22 to hold the seat receiving tube 22 in position relative to the base receiving tube 18. When the handle pin 24 is inserted into the base receiving tube 18 so as to be engaged with the second circumferential groove 98 of the seat receiving tube 22, the seat receiving tube 22, and any adjustable seat 26 positioned therein, may be positioned at a first height relative to the base 12, and when the handle pin 24 is inserted into the base receiving tube 18 so as to be engaged with the first circumferential groove 96 the seat receiving tube 22 may be positioned at a second height relative to the base 12. In this manner, the height of the seat receiving tube 22, and any adjustable seat 26 positioning therein, may be adjusted relative to the base 12 of the reconfigurable dolly 10.

Figure 23:
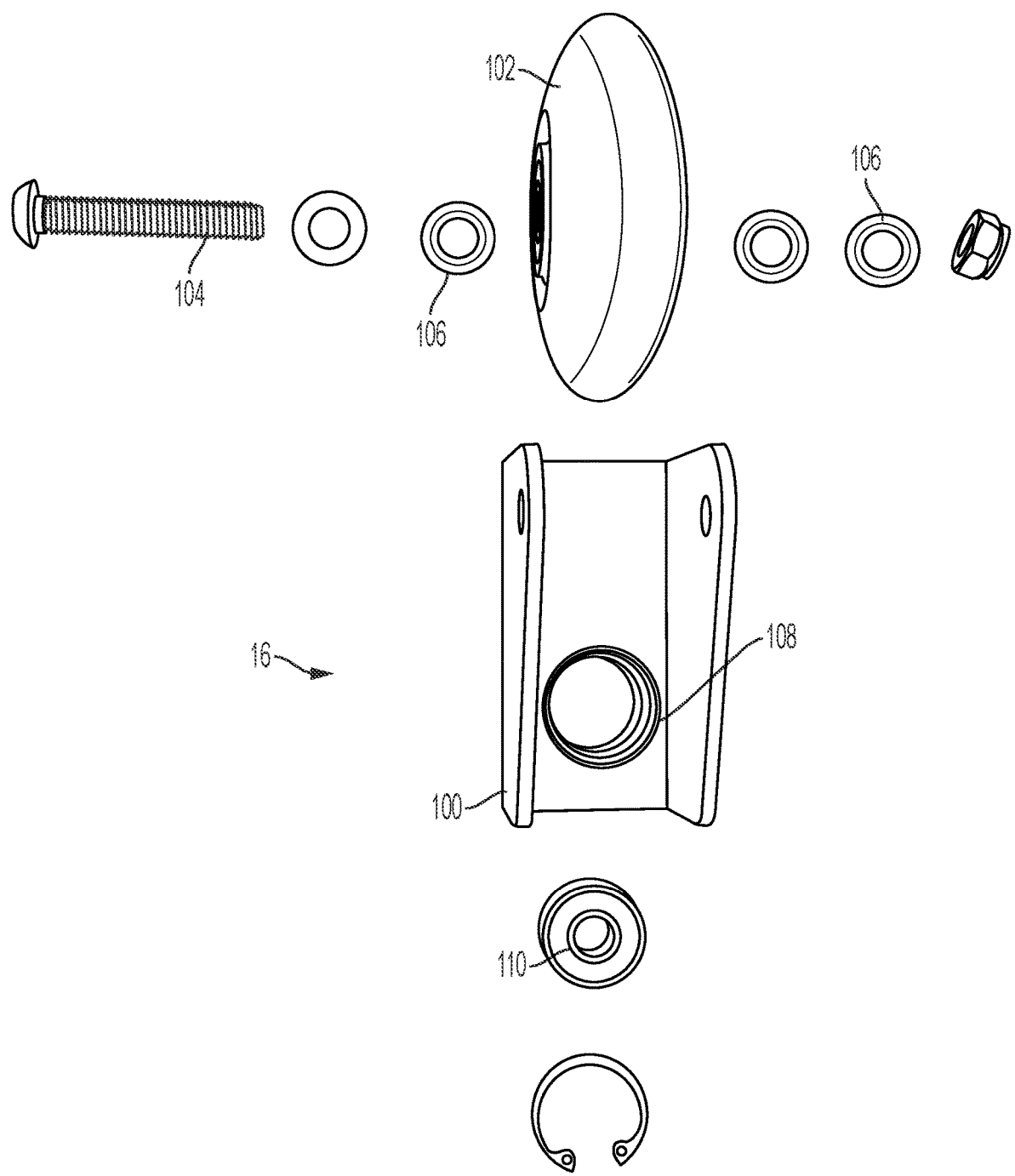
FIG. 23 is an exploded view of an exemplary caster wheel of the exemplary reconfigurable dolly.

Referring now to FIGS. 23-25, the caster wheel 16 of the reconfigurable dolly 10 may include a fork 100 that is configured to retain a wheel 102 to allow for rotation of the wheel 102. The wheel 102 may be any suitable wheel, for example a urethane wheel such as the LABEDA GRIPPER available from Labeda USA. The wheel 102 may be retained within the fork 100 by a bolt 104 and one or more washers 106 that may be positioned between any bearing (not shown) in the wheel 102 and the fork 100 and/or the bolt 106 and the fork 100. The caster wheel 16 may also include a bearing housing 108 that is configured to hold a bearing 110 to allow for rotation of the caster wheel 16 around an axis substantially perpendicular to the axis of rotation of the wheel 102. The bearing housing 108 may include a bearing holding area 112, which may include a retaining clip notch 114 for holding the bearing 110 within the bearing housing 108. The bearing housing may also include a spacer receiving area 116 that is configured for receipt of a spacer 118 that may be positioned between the fork 100 and the base 12. The caster wheel 16 may be pivotably secured to the base 12 by passing a suitable fastener (not shown) through the spacer 118 and bearing 110.

It is understood that any of the above components may be made from any suitable material, and may preferably be constructed from a metal, such as aluminum, when appropriate to the application of such component.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed:

1. A reconfigurable dolly, comprising:
   a base having an outer ring and an inner ring;
   at least one removable base plate positioned between the outer ring and the inner ring of the base; and
   at least one caster wheel operatively coupled to the base;
   wherein the outer ring and the inner ring are connected by at least one connecting member; and
   wherein the outer ring, the inner ring and the at least one connecting member define at least one removable base plate aperture in the base.

2. The reconfigurable dolly according to claim 1, wherein each of the at least one removable base plate apertures comprises a ledge extending at least partially around the perimeter of each of the removable base plate apertures.

3. The reconfigurable dolly according to claim 1, wherein the outer ring comprises at least one caster wheel connecting hole configured to operatively couple the at least one caster wheel to the base by a fastener.

4. The reconfigurable dolly according to claim 1, wherein the connecting member comprises at least one inner rigging hole; and wherein the outer ring comprises at least one outer rigging hole.

5. The reconfigurable dolly according to claim 1, wherein the inner ring comprises a central opening formed therein and at least one keyway extending radially from the central opening.

6. The reconfigurable dolly according to claim 5, further comprising a base receiving tube having a threaded portion that is dimensioned to pass through the central opening of the inner ring, and configured for threaded engagement with a castle nut to affix the base receiving tube to the base.

7. The reconfigurable dolly according to claim 5, wherein the central opening and at least one keyway are configured in the form of a Mitchell mount.

8. The reconfigurable dolly according to claim 1, wherein the base further comprises a circumferential groove formed at least partially around the perimeter of the base, and a bumper disposed at least partially within the circumferential groove and extending at least partially around the perimeter of the base.

9. The reconfigurable dolly according to claim 1, wherein the base plate comprises a peripheral wing extending at least partially around the perimeter of the base plate, and the peripheral wing is configured for engagement with the ledge of the base.

10. The reconfigurable dolly according to claim 1, wherein the base plate comprises at least one plate rigging hole.

11. The reconfigurable dolly according to claim 1, wherein the base plate comprises at least one pivotable cam lock, and wherein the pivotable cam lock is positionable between an open position in which substantially the entirety of the pivotable cam lock is encompassed within the base plate, and a locked position in which at least a portion of the pivotable cam lock extends past the base plate, and wherein the pivotable cam lock is configured for locking engagement with the outer ring of the base when the pivotable cam lock is in the locked position.

12. The reconfigurable dolly according to claim 1, wherein the caster wheel comprises a fork configured to receive a wheel to allow the wheel to rotate about the axis of rotation of the wheel, and a bearing housing configured for receipt of a bearing to allow for pivotable coupling to the base.

13. The reconfigurable dolly according to claim 1, further comprising a base receiving tube configured for removable attachment to the base.

14. The reconfigurable dolly according to claim 13, wherein the base receiving tube comprises a longitudinal central bore, and at least one pin receiving bore positioned substantially perpendicular to the longitudinal central bore.

15. The reconfigurable dolly according to claim 13, further comprising a seat receiving tube configured for telescopic arrangement with the base receiving tube, and positionable at a first height relative to the base receiving tube and a second height relative to the base receiving tube.

16. The reconfigurable dolly according to claim 15, wherein a length of the seat receiving tube and the base receiving tube at the first height is greater than a length of the seat receiving tube and the base receiving tube at the second height.

17. The reconfigurable dolly according to claim 15, wherein the seat receiving tube comprises a first end, a second end and a longitudinal passage connecting the first end to the second end.

18. The reconfigurable dolly according to claim 17, wherein the first end comprises a shoulder positioned within the longitudinal passage and configured for receipt of a collar, wherein the first end comprises a notch formed within the longitudinal passage for retention of a retaining ring, wherein the second end comprises a shoulder positioned within the longitudinal passage and configured for receipt of a bearing, wherein the seat receiving tube further comprises a seat base configured for positioning within the bearing, and wherein the second end comprises a notch formed within the longitudinal passage for retention of a retaining ring.

19. The reconfigurable dolly according to claim 17, wherein the seat receiving tube further comprises a first circumferential groove formed in the exterior of the seat receiving tube and positioned towards the first end of the seat receiving tube, and wherein the seat receiving tube further comprises a second circumferential groove formed in the exterior of the seat receiving tube and positioned towards the second end of the seat receiving tube.

\* \* \* \* \*